Oct. 29, 1946.　　　A. G. MIREL　　　2,410,298
METALWORKING MACHINE
Filed Dec. 26, 1942　　　5 Sheets-Sheet 1
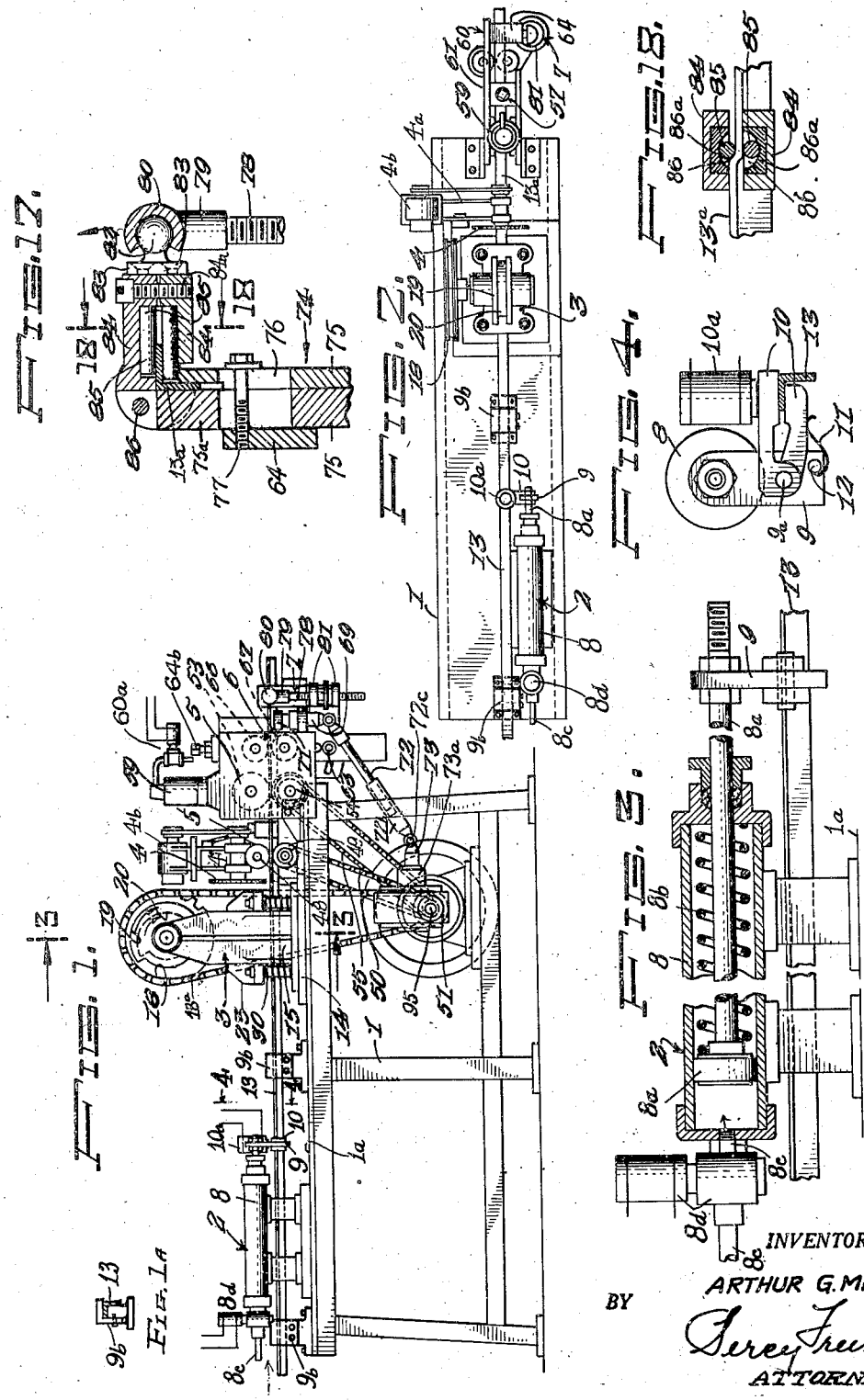
INVENTOR.
ARTHUR G. MIREL.
BY
Serge Freeman
ATTORNEY.

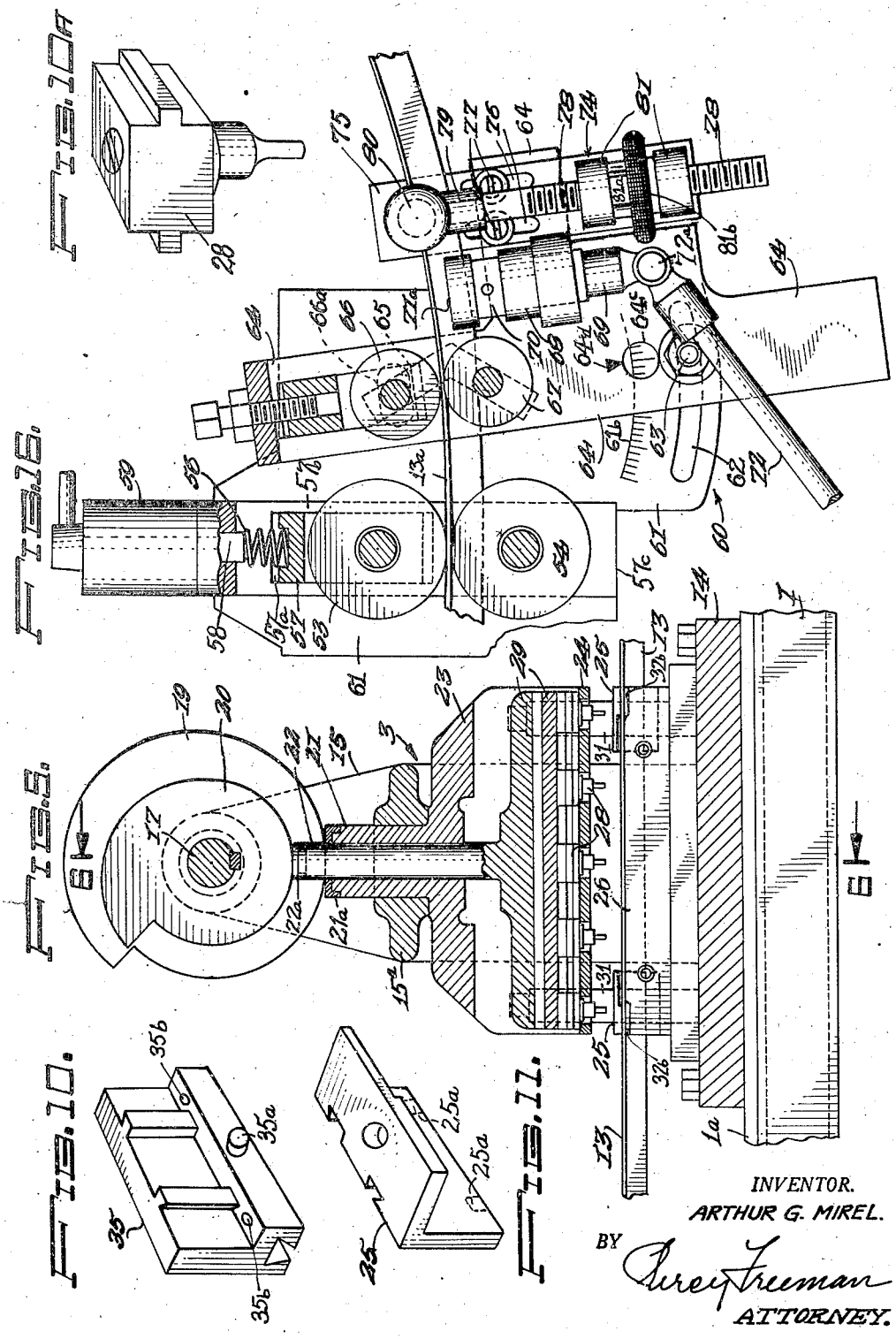

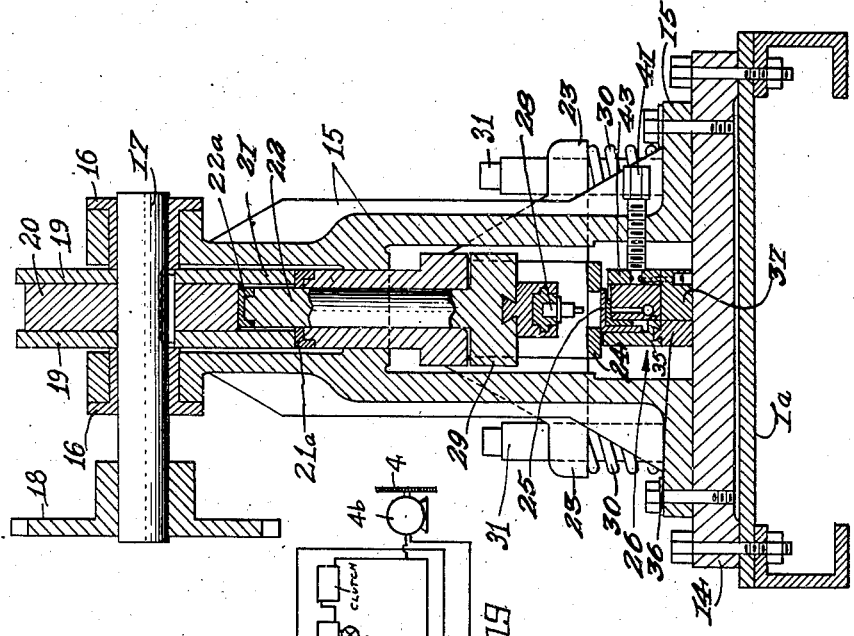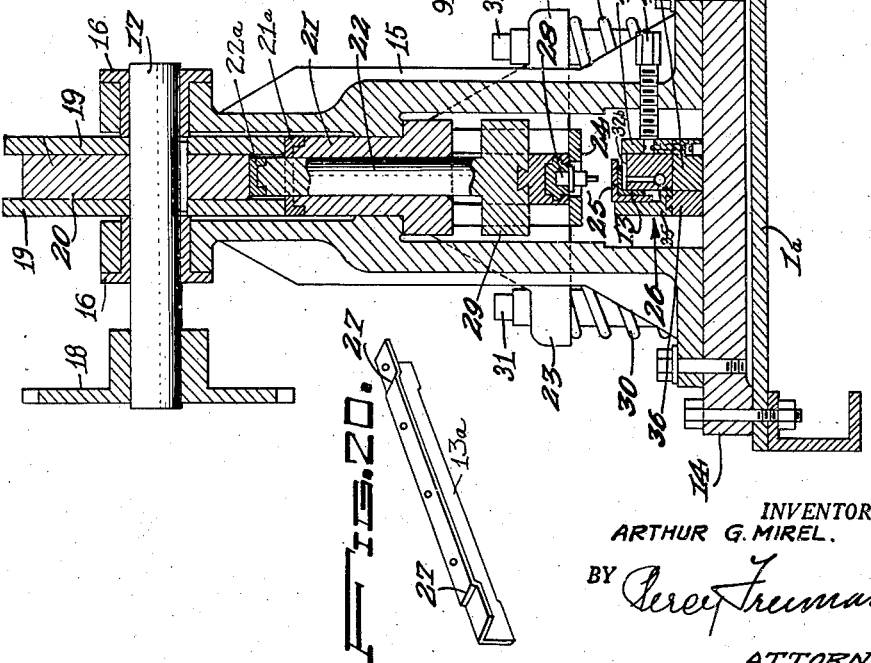

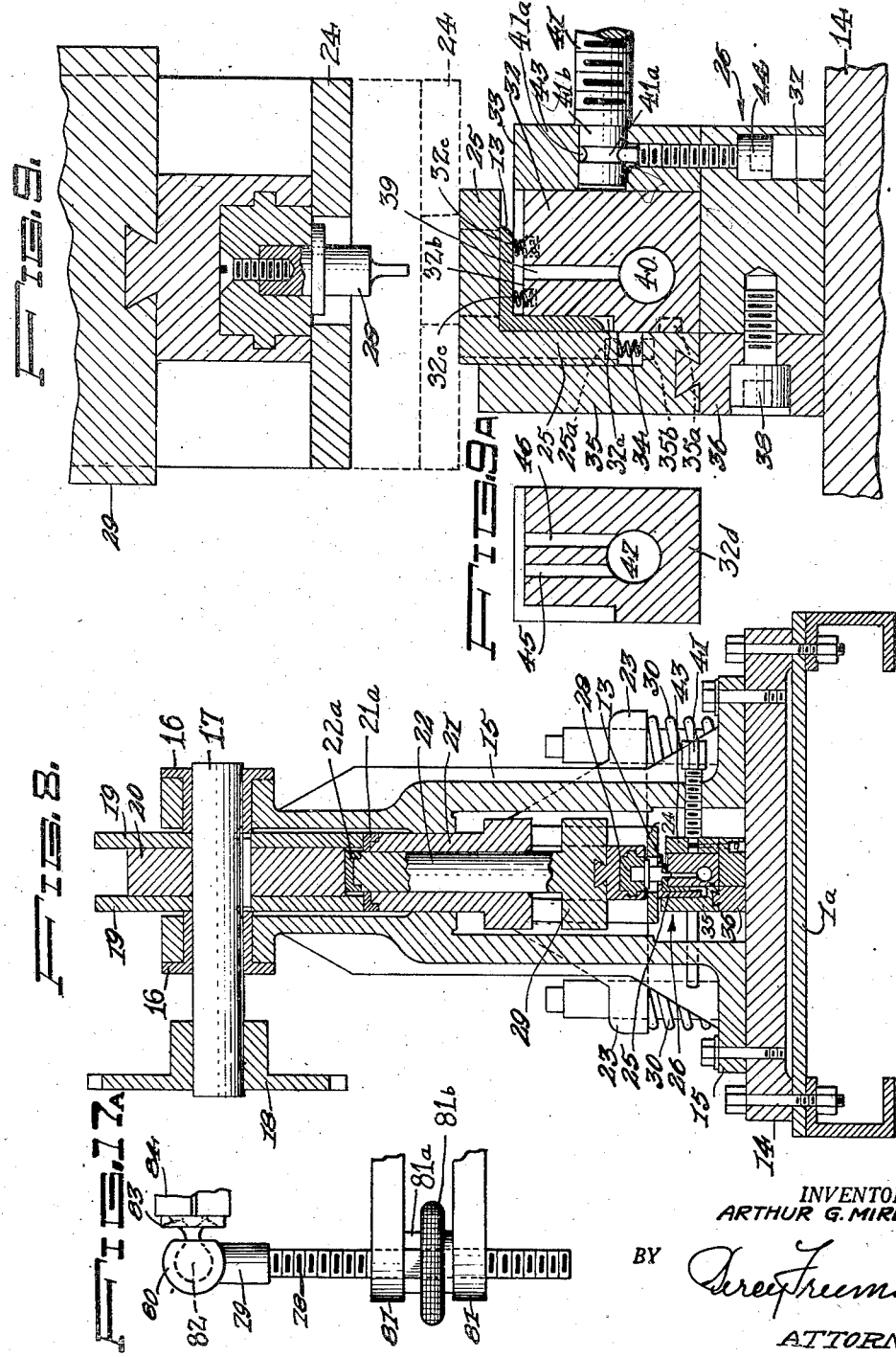

Oct. 29, 1946.　　　A. G. MIREL　　　2,410,298
METALWORKING MACHINE
Filed Dec. 26, 1942　　　5 Sheets-Sheet 5
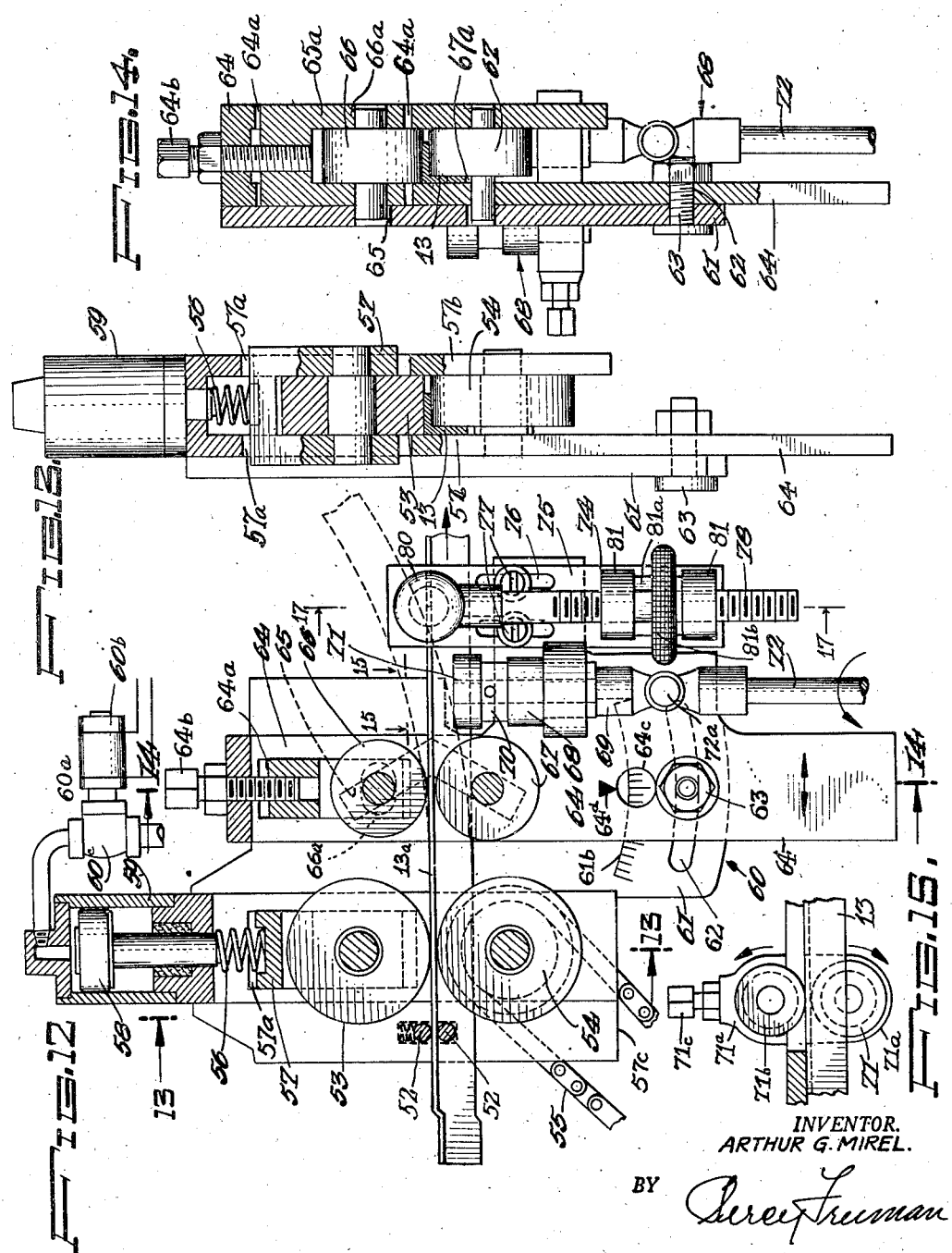
INVENTOR.
ARTHUR G. MIREL.
BY
*Seree Freeman*
ATTORNEY.

Patented Oct. 29, 1946

2,410,298

UNITED STATES PATENT OFFICE 2,410,298

METALWORKING MACHINE

Arthur G. Mirel, New York, N. Y., assignor to Structural Planeparts, Inc., New York, N. Y., a corporation of New York Application December 26, 1942, Serial No. 470,133

35 Claims. (Cl. 153—2)

This invention relates to apparatus for producing from angle or bar stock, predetermined lengths of structural material of the type now used in airplane construction and for similar purpose.

The prime object of the present invention is to provide a unitary organized mechanism specially designed and adapted to handle and operate on aluminum or other metallic angle sections having webs of various width and thickness, to punch holes therein as required, to joggle the ends or intermediate portions thereof, as required, to cut off the stock into desired lengths, to contour the length as by curving it from the straight line, and also to vary the angle of the stock or piece from its original angle, as desired.

A further object is to provide a machine which is capable of simultaneously joggling and piercing an angle bar.

Another object is to provide a machine capable of forming a straight length of angle bar into a curved one.

Still another object is to provide a machine capable of joggling and piercing a straight length of angle bar in one operation and thence contouring said length into curved form without changing the angular cross-section thereof.

It is a further object to provide a machine capable of handling a straight length of angle bar and turning it out in the form of curved pieces pierced at predetermined points and joggled at one or both ends.

A further object of the present invention is to provide a machine having means for handling and automatically feeding a straight length of angle bar into a press capable of joggling and piercing the stock at predetermined points, and turning it out in the form of relatively short curved lengths or pieces.

Again, it is an object of the present invention to provide in such a machine means whereby the angle between the webs of the angle bar may be changed.

Other objects will appear as the description proceeds.

In the drawings:

Fig. 1 is an elevation of a machine embodying all the features enumerated above.

Fig. 1A is a detail showing in side view the member for guiding and supporting the stock.

Fig. 2 is a plan or top view of Fig. 1.

Fig. 3 is an enlarged view, partly in section, of the feeder.

Fig. 4 is a side view thereof, on the line 4—4 of Fig. 1.

Fig. 5 is an elevation enlarged and partly in section, of the punch press unit of the machine.

Figs. 6, 7 and 8 are the same sections on the line 6—6 of Fig. 5, showing the punches or rams of the press in different operating positions.

Fig. 9 is an enlarged sectional view showing in greater detail, the construction of the punch and die block and joggling member.

Fig. 9A is a detail showing a modified form of the die block member.

Fig. 10 is a perspective view of the block for holding the joggling member shown in perspective in Fig. 11.

Fig. 10A is an enlarged perspective of one of the piercing tools.

Fig. 11 is a perspective view of the joggling member.

Fig. 12 is an elevation, partly in section, of mechanism for guiding and advancing the stock or piece of angle iron after the punching operation, as well as mechanism capable of being adjusted to cause the straight angle bar to be put out in curved form, with means, at the option of the operator, for changing the angle of the angle bar or piece.

Fig. 13 is a sectional view on the line 13—13 of Fig. 12.

Fig. 14 is a sectional view on the line 14—14 of Fig. 12.

Fig. 15 is a sectional view on the line 15—15 of Fig. 13.

Fig. 16 is a view similar to Fig. 12 showing the mechanism for curving the angle bar in position to perform such operation.

Fig. 17 is a section on the line 17—17 of Fig. 12.

Fig. 17A is a fragmentary detached elevational view of the angle changing unit.

Fig. 18 is a sectional view on the line 18—18 of Fig. 17.

Fig. 19 is a circuit diagram for controlling the feeding, cutting or sawing and ejecting or advancing mechanism.

Fig. 20 is a perspective view of the article as turned out by the machine showing the same with joggles at both ends and perforated along the horizontal web.

Referring to the aforesaid figures, and for the moment to Figs. 1 and 2, it will be seen that my machine comprises a suitable support 1 upon which is mounted in proper alignment a feeder 2, a press 3, cut-off saw 4, two sets of driven rollers 5 and 5', respectively, for advancing the stock, mechanism 6 for curving or contouring the stock or piece, and mechanism 7 for changing the original angle of the bar.

The feeding mechanism 2, shown in detail in Figs. 3 and 4, comprises a casing 8 in which is disposed a piston 8a acted upon by a spring 8b to normally maintain said piston adjacent one end of said casing. Communicating with the interior of said casing is a pipe 8c connected to a compressed air tank (not shown), through which pipe is admitted, from time to time, and in the manner and for the purposes to be presently disclosed, blasts of air under pressure sufficient to advance said piston forward in the casing against the resistance of the spring. The flow of compressed air into the casing is controlled by a solenoid-operated valve 8d electrically connected as shown in the circuit diagram of Fig. 19. Upon the exposed end of the piston is mounted a depending arm 9 through which passes a rivet or bolt 9a upon which is pivotally mounted a pair of clamping jaws arranged to engage the horizontal web of angle bar 13. The lower jaw 10 is maintained in normal horizontal position at all times, by spring leaf 11 attached at one end to a stud 12 on arm 9. The upper jaw 10 normally rests lightly on the upper surface of the horizontal web but is forced, upon energization of the solenoid 10a, into close contact with said web whereby the angle bar will be tightly held between the said clamping jaws. The position of the solenoid 10a in Fig. 4 is symbolic only. Repulsion of the upper jaw by the said solenoid (as can be done) will accomplish the clamping operation. But the parts may be rearranged so that the clamping operation is effected by attractive force. The movement of the piston to feed the stock may be accomplished by other than pneumatic force, as conditions may require or convenience suggest. At suitable points on the platform 1a of the support, are disposed suitable members 9b, for guiding and supporting the stock (see Fig. 1A) to and from the feeder.

The press 3, as most clearly illustrated in Figs. 5 to 9 inclusive, comprises a die bed 14 mounted on platform 1a, while to said die bed is bolted the frame 15 of the punch part of the press. Passing through bearings 16 in the upper part of the frame is a shaft 17 driven by a sprocket wheel 18 mounted on one end of said shaft. Upon said shaft are also mounted cams 19 and 20 respectively, the former consisting of identical but spaced cam elements and the latter one being disposed therebetween. Both are preferably keyed to the shaft, as shown, and all rotate with the shaft simultaneously. Cams 19 bear on the shank 21 having slidable movement in the collar 15a of the frame 15, while cam 20 bears on coaxial shank 22 slidable in shank 21. Shanks 21 and 22 are provided with caps 21a and 22a respectively for two purposes: one to take the wear, for which purpose the caps are made up of a metal or alloy resistant to wear, while the other purpose is to enable shimming to make up for the wear. Shank 21 is part of the punch or ram 23, the bottom 24 of which is arranged to come down upon the joggling members 25 held in die block 26 (see Figs. 6 to 9 inclusive), and thus produce the joggles 27 in the angle bar, as most clearly shown in Fig. 20. Preferably, the bottom 24 of the ram 23 is kept in contact with the angle bar for a short period so as to hold the work down and thereby allow the piercing members 28 to perform their piercing operations satisfactorily and with accuracy. Said piercing punches 28 (Fig. 10A) are of conventional type and are attached to the elongated portion 29 integral with shank 22, by means of a dovetail, T-slot or other tongue-and-groove connection. Thus, by a substantially simultaneous operation of the rams of the press, two operations are performed upon the work at one stroke, namely, joggling and piercing. The rams are returned automatically to top position by the springs 30, since the ram 23 is guided on posts 31, around which the springs 30 are positioned. Downward movement of the ram 23 by cams 19 compresses springs 30, and when the cams pass their high places the ram 23 is raised, through the action of said springs, the bottom 24 of the ram engages the bottom of the punch or ram 22—29 and raises it also.

In Figs. 5 and 6, both rams are shown in their top positions, Figs. 6, 7 and 8 being sectional views on the line 6—6, with Figs. 7 and 8 showing the rams in different operative positions. In Fig. 7, the ram 21—23 is shown in depressed position with the piercing punch in the upper position. In Fig. 8 both rams or punches are depressed.

For a clearer understanding of how the joggling operation is performed, reference is made particularly to Figs. 5, 9, 10 and 11. As is made clear in said illustrations, the angle bar stock is guided along block 32, which, as most clearly shown in Fig. 9, has a top surface 33 upon which the horizontal web of the angle bar rests and moves along, and a groove 32a in the side thereof, in which the vertical web of the angle bar is positioned.

For the purposes of the present invention, it will be found convenient to have a series of die blocks, such as the one marked 26, said die blocks being in the usual manner (not shown) held in aligned relation on the die bed. Those blocks 32 of die blocks 26 which are to coact in the joggling operation have a depressed table 32b adjacent to the normal surface of block 32. So that when the joggling member 25 (Fig. 11) is pushed down by the bottom 24 of the ram 21—23, a joggle or offset will be formed in the angle piece of the nature illustrated in Fig. 20. One or more springs 34 (Fig. 9), one end of which is disposed in an opening 25a in blocks 25 and the other end of which is disposed in opening 35b in block 35, automatically elevates the joggling member to clear the way for the stock to pass on as the ram 21—23 rises. In order to enable the joggled angle piece or stock to clear and pass on along the die blocks, springs 32c, having their lower ends disposed in openings in block 32, bear against the bottom of the horizontal web, which lifts the said angle bar upon retraction of the ram 23.

The joggling member 25 is attached to block 35 by a dovetail connection (see Figs. 10 and 11), while block 35 is dovetail-connected to block 36 and dowel-connected by dowel 35a to block 32. Block 36 is connected to block 37 by means of screw 38, while block 37 is connected to block 43 by means of screw 44, the end of which is positioned in the circular groove 41a of the inner end 41b of screw 41, the function of which will be described presently.

It will be observed that block 32 has a vertical bore 39 communicating with a larger horizontal bore or cavity 40. Bore 39 is in direct line with the piercing element of 28 and is penetrated by it after it passes through the metal. The resulting slug finally finds its way down into the large horizontal bore or cavity 40, from which at some convenient time the slugs are removed.

In order to assure the exact registry of bore 39 and piercing element 28, the screw 41 is provided, the latter passing through a threaded opening in the frame and having a circumferentially grooved tip fixed in an opening 43a in block 43, through the intervention of the end of screw 44 in said groove. The screw 41 is provided with a knurled head to facilitate turning the same, and it will be obvious as the same is turned in one direction or the other, as the case may be, the die block 26 will be advanced or retracted, to effect the desired registry.

In Fig. 9A, block 32d is provided with two vertical bores 45, 46, communicating with a single horizontal bore or cavity 47. This form of block is useful where holes are to be pierced in the angle bar in one of two locations.

To the right of the press 3 is a circular saw 4 attached to a swinging arm 4a and driven by the motor 4b. The saw is brought into position for cutting the stock at predetermined intervals into predetermined lengths 13a, following the piercing and joggling operation, the work having been advanced to this latter position by the actuation or operation of the feeder in the manner presently to be disclosed.

The length or piece of angle bar thus created is advanced by rollers 48 and 49 (Fig. 1), the latter being driven by sprocket chain 50 connected to the common drive through an electromagnetically controlled or operated clutch (not shown except diagrammatically in Fig. 19), which is "out" during the sawing operation and "in" when it is necessary to advance the work, as will be made more clear presently in connection with the discussion of the circuit diagram (Fig. 19). The piece 13a (Figs. 12 to 18 and 20) is guided by spring-pressed rollers 52 and advanced by rollers 53 and 54, the latter being driven by sprocket chain 55 (Fig. 12) connected to the common drive, while the former is pressed into close yielding engagement with the said piece by the spring 56 interposed between the yoke 57, in which roller 53 is journalled, and piston 58, disposed in an airtight cylinder 59, the piston 58 being arranged to be acted upon by compressed air. The desired degree of pressure upon roller 53 is supplied by varying or controlling the compressed air admitted to chamber 59. It will be understood that where the uncut stock extends beyond rollers 53—54, the rollers will be inoperative to advance the stock but will leave the stock at rest until the sawing operation has been completed. To this end, it is desirable to provide means for effectuating this purpose, and this is provided by means, made more clear by circuit diagram Fig. 19 and the discussion thereof, wherein the solenoid valve cuts off the compressed air from cylinder 59 during the sawing operation. As shown in Figs. 1 and 19, the admission of compressed air into the chamber 59 is accomplished through the operation of the solenoid-operated valve 60a.

It will be observed that the yoke 57 with roller 53 journalled therein normally rests lightly upon the horizontal web of the angle bar and is "floated" in openings 57a in the side walls of bracket 57b, and is kept in aligned position therein by virtue of the spring 56 and the lower side walls of the bracket 57. Roller 54 is journalled in the lower arms of bracket 57b. The extreme lower end 57c of the arms 57b is connected by screw 57d (or any other means) to fixed plate 61.

In order to form straight piece 13a (or the straight stock, if cutting into lengths is not desired) into a curved piece, I provide an attachment 60 which comprises a fixed plate 61 having an arcuate slot 62 in which rides screw 63 clampingly engaged between it and the lower arm of a bracket 64, the sides of which plate 61 are provided with an angular slot 65. At the upper end of bracket 64, the side walls are provided with openings 64a, in which is disposed a yoke 65a having journalled between the side arms thereof, roller 66, resting on the horizontal web of the angle bar 13 or 13a, as the case may be, the ends of said roller extending in the upper portion of angular slot 65. Between the arms of bracket 64, below the roller 66, is journalled the roller 67, the ends of which are engaged in the lower portion of the angular slot 65. Between rollers 66—67, is disposed the horizontal web of the angle bar 13. It will be obvious that when the member 64 is moved away from the vertical, the axial alignment of the rollers will also be shifted or canted away from the vertical, as shown in Fig. 16, which will cause the angle bar to be curved in its passage between said rollers. Mounted upon the shaft of roller 67 is a washer 67a, the diameter of which will vary depending upon the height of the vertical web of the angle bar and upon which the bottom of said web is adapted to rest. The yoke 65a is maintained in place by virtue of the roller 66 being positioned between the sides of the bracket 64, and the screw 64b, which passes through the upper part of said bracket 64 and into the upper part of the yoke 65a. The screw 64b is also employed to depress or lower the yoke 65a and thereby increase the pressure of the roller upon the angle bar. The member or unit 64 has an opening 64c, through which can be viewed the graduated scale 61b on plate 61, and following the arcuate slot 62. An index mark 64d on member 64 just above the opening 64c, enables one to determine and select the inclination of member 64 and hence the degree of inclination of the rollers 66—67 and hence the radius or degree of curvature of the angle bar. When the unit 64 is in the perpendicular position shown in Fig. 12, the piece will come out straight. If, however, it is desired to curve the piece, unit 64 is moved to an angle to the perpendicular, as illustrated in Fig. 16. The radius of curvature can be increased or decreased by making this angle less or more, as the case may be.

In order to guide and advance the work or piece beyond the rollers 66—67, means are provided which will function to serve this purpose, regardless of the extent of curvature imposed upon the piece or work. This is accomplished by attaching to the member 64, a collar or sleeve 68 in which is slidably mounted shank 69 to the upper end of which is attached a collar 70 upon which rests a wheel 71 mounted on shank 69. Said wheel 71 is mounted in a casing 71a (Fig. 15) which also contains wheel 71b, both wheels being adapted to engage the vertical web of the work or piece. Screw 71c is employed to regulate the pressure imposed on roller 71b, and hence the degree of pressure upon said web between rollers 71 and 71b. The shank 69 is connected through a universal joint 72a to shaft 72, which is in turn slidably splined in extension 72b (see Fig. 1), the latter being in turn connected through a universal joint 72c, to arm 73, coupled to gear 73a (shown as a gear box in Fig. 1), driven from the common drive. This linkage enables the shank 69, and hence the wheel 71 mounted thereon, to be rotated. Thus, as the unit 64 is inclined or moved the shank 69 is inclined with it, and so are the rollers 71—71b, the shaft 72 being free to move on the spline. It will, therefore, be apparent that in changing the inclination of unit 64, the desired radius of curvature will be effected without doing more. Extremely sharp curvatures may require adjustment of the shaft 72, but this factor will also be determined by the height of the vertical web of the work or piece.

Also mounted on the member 64 is an attachment 74 comprising a plate 75 provided with parallel vertical slots 76, through which pass screws 77 which connect the said plate to said member. A threaded rod 78, engaged at its upper end in the sleeve extension 79 of the socket 80, extends through internally threaded spaced collars 81 affixed to the plate 75, and a hexagonal nut 81a with which is integral a knurled portion 81b enabling one to turn the same with one's fingers. Said member 81a—81b is positioned between collars 81, and when turned, causes the threaded rod 78 to be raised or lowered. The socket 80 engages balls 82 (Figs. 17 and 18), and is connected by screws 83, to a pair of jaws 84, carrying or housing a pair of spaced horizontal rollers 85. The said jaws 84 are connected to each other at one end by screw 84a, while the upper jaw member is pivotally connected through pivot 86 to a plate 75a sandwiched between plates 64 and 75. The rollers 85 engage between them the horizontal web of the work or piece 13 while the vertical web thereof is disposed between plates 75 and 75a. It will now be seen that when the rod 78 is raised, while plates 75—75a remain stationary, upper jaw 78 will pivot on 86 to assume an inclined position. Since the lower jaw and rollers 85 moved with the upper jaw as a unit (excepting, of course, the rotation of the rollers), they will all assume an inclined position, to form an obtuse angle with fixed plates 75—75a, when the rod 78 is raised, and an acute angle when the rod 78 is lowered. Since the vertical web of the piece 13a is clamped between plates 75 and 75a, and free to move only in the direction of its length, the effect of inclining the said rollers will be to change the original angle of the piece or stock.

The entire attachment 74 may be arranged to float vertically with respect to the adjustable back plate 64 so that as a joggled piece of angle bar is passing through between the rollers 85, the attachment 74 will be free to move upwardly to avoid damage to the offset portion. It will be apparent, however, that no change in the angle of the piece can take place where the rollers are "normal" to the straight piece or the radius of curvature of the curved piece. It is one of the virtues of this angle-changing mechanism that when it is not functioning to change the angle of the work or piece, it, nevertheless, participates in guiding the work or piece along to final ejection. This is also true of the mechanism for curving the straight pieces or stock; whether it is adjusted to curve the piece or stock or not, it always acts to guide the work or piece along.

It should be observed that the attachment 74, being attached to member 64, is inclined or moved with it, so that when the curving mechanism is changed in its inclination, the attachment will also automatically move with it. Obviously, it is possible to change the angle without at the same time curving the piece and vice versa.

Fig. 18 shows the expedient employed for accommodating the joggle in the piece while passing through the rollers 85. It may be desirable at times, to have the joggle or offset at an angle other than right angles to the vertical web 13a. In such case, provision is made for the rollers 85 to swing with respect to their holders or jaws 84, and this is made possible by disposing said rollers in gullies 86 in gully-blocks 86a which, themselves, are freely rotatable on a vertical axis in the jaws 84.

Referring to circuit diagram (Fig. 19), it will be seen that the solenoids or electromagnets connected respectively with the compressed air valve 8d, associated with the feeder 2, the solenoid 10a actuating the clamping jaws 10 thereof, the solenoid associated with the solenoid-operated valve 60a for controlling the input of compressed air into the chamber 59, and the electromagnetic means for operating the clutch associated with sprocket chain 50, are all connected in series through an arcuate contact 90 and switch or wiper arm 91 of switch 92, while the motor 4b is connected to the power source through the arcuate contact 93 and switch arm 91. The said switch 92 may be mounted at any suitable point on the machine, a convenient place to mount it being directly on the shaft 17 or in proximity thereto. Either the disc 94 or the switch arm 91 of the switch may remain stationary while the other is rotating. The solenoids including the one for the clutch, are connected in series so that should failure occur in operation in the advanced solenoids, all solenoids will be disconnected so as to avoid work being fed through the feeder and so on, while advanced parts of the machine are clogged up or at a standstill. The motor is operated through a separate circuit so that no movement of the stock will take place while the sawing operation is going on.

In operation, the device works as follows:

As already pointed out, the machine of my invention has been designed to perform certain operations on angle bars, particularly of aluminum, the machine being provided with the necessary means to joggle, pierce, curve and vary the angle of the angle bar worked on, in one pass of the work through the machine, or with the aforesaid means present in their assigned positions or stations to perform only one or less than all of the operations above enumerated, upon said work. That is, the parts can be so aligned that, say, only the joggling and piercing operations are performed while the curving and angle-bending or changing members are adjusted to pass on the work or piece without accomplishing either. Or, the press operation may be tooled to perform either the joggling operation or the piercing operation. If joggling is omitted and only piercing accomplished, the stock can be passed on through without more, with or without cutting the stock or length of angle bar into predetermined lengths or pieces. In the latter instance, the saw will be immobilized by disconnecting the motor from the circuit. Again, whether the stock has been joggled or pierced or both, and whether it has been cut into predetermined lengths, joggled and/or pierced, the said stock or piece, as the case may be, as already stated, may be passed on and through without more, or it can be subjected to both curving and angle-changing operations or to either. In each and all cases, the various mechanisms associated with the said curving and angle-changing components of the machine participate in the advance of the work or piece through the machine, whether such components accomplish respectively the functions of curving and angle-changing or not, since in any case, the work is guided through them, as explained during the description of the figures.

Sprocket chains 18a, 50, 55, and universally connected shaft 72 are connected to the common drive 95 (Fig. 1). The speed of feeding and advancing the work will depend to a very large extent upon the speed of operation of the press, and this in turn will depend upon the speed of rotation of cams 19—20 driven by sprocket chain 18a. This can be regulated by adjusting the speed or rotation of the motor of the main drive 95, or the ratio of the diameters of the respective sprocket wheels. With respect to rollers 49, 54, and 71, driven, respectively, through sprocket chains 50, 55 and linkage 72, the speed of rotation thereof will be largely conditioned upon the speed required to properly curve and angle-change the work or piece. Where these last two operations are omitted, the work can be shot through at a higher speed. In any case, the advance of the work beyond the cutting saw should be at least as rapid as the feed of the stock into the press. The rapidity of the feed of the stock will, to a very large degree, depend upon the rapidity with which the press operates, and will be governed thereby.

In any case, the length of angle bar stock is brought up to a predetermined point of the machine, said point being preferably between the press and the inner end of guide bracket 9b. The horizontal web of the angle bar is first preferably disposed in guide brackets 9b, and clamping jaws 10 before starting the machine, and the feeder will have been so adjusted that movement of the piston 8a will advance the work a predetermined amount or increment. This advance, when the stock is to be cut into given equal lengths, should be such as to bring the inner end of the stock up to the circular saw and the increment feed under the circumstances, should correspond to the distance between the circular saw and a point equally distant from the other side of the press.

Now, assuming the stock to be aligned in brackets 9b, as aforesaid, the main switch is thrown. Cams 19—20, which have been previously set so that the pressing operation will occur at the proper interval, as they go round, depress rams 21—23 and 22—29, and then release them. The switch 92 (Fig. 19) is so set that at least for an appreciable part of the time that the cams are depressing the rams, the movement of the stock will be at a standstill, at least up to the point of the rollers 66—67. As the rams ascend, the switch 92 will be so arranged that the wiper arm will engage arcuate contact 90. This will cause the solenoid valve 8d to open and admit the compressed air into the casing 8 to push the plunger 8a against the resistance of the spring 8b. At the same time, electromagnet 10a will be energized to cause the clamping jaws 10 to firmly grasp the stock, with the result that the stock will be advanced (depending upon the extent of thrust of piston 8a—which can be regulated). As the wiper arm leaves the contact 90, solenoids 8d, 10a (as well as the solenoid of 60a and the electromagnet controlling the clutch) are de-energized, and the movement of the stock is stopped. Upon the wiper arm coming into engagement with contact 93 the sawing operation commences and continues for the necessary period, to effect complete cutting through of the stock. Obviously, during this cutting operation, the rams of the press are still in movement, and if the speed and parts are adjusted properly, the pressing operation will be effected very shortly after the saw has swung back to inoperative position. The effective press stroke takes place during the interval represented by the gap between contacts 93—90, roughly speaking. On the uprise of the rams, wiper arm 91 again engages contact 90 to advance the stock, etc. In the meantime, the piece which had been cut off, has been advanced by rollers 48—49 during the period that solenoid 8b was last energized, since at the same time that the latter was energized, the electromagnet which controls the clutch operatively connecting said rollers 48—49 to the main drive, was also energized, both solenoids being in the same circuit and controlled by the same switch. The said piece is advanced, through guide rollers 52, to rollers 53—54, which are so arranged as to be effective in advancing the piece further only when roller 53 is imposed upon by the plunger 58 (Fig. 12), which is the case when the solenoid 60b of solenoid-operated valve 60a is energized, admitting compressed air into the cylinder 59. Solenoid 60b is connected in circuit with the aforementioned clutch and solenoids as a matter of convenience, as well as simplicity.

After the piece enters the rollers 66—67, it is advanced by wheels (rollers) 71—71b (Fig. 15) through rollers 85.

As already stated, the straight length of angle bar stock or piece after emerging from between rollers 53—54, may continue on through unchanged or be curved and/or angle-changed. Curvature of the stock or piece is accomplished by moving the unit 64 to a position inclined from the perpendicular. Shank 69, which, of course, is a part of unit 64, is also inclined, and this inclination (including that of the rollers or wheels 71—71b) is to bring the said rollers "normal" to the curvature of the piece or stock. Where necessary, shank 69 and rollers or wheels 71—71b may be raised the required amount in the manner already described. Equally, rod 78 and attachment 74 assume a like inclination to the same end, and the attachment may be raised in accordance with the extent of the curvature of the stock or piece. By raising or lowering the rod 78, the inclination of the rollers 85—85 may be changed from an angle "normal" to the radius of curvature to one beyond the "normal."

I claim:

1. A machine of the class described comprising in combination, means for feeding angle bar stock in predetermined increments, a press for working upon said stock, adjustably positioned upper and lower cooperating joggling dies in said press, means for reciprocating the press to joggle the stock between said dies, means operative when the press is raised to elevate the stock to permit the joggled portion of the stock to pass by the lower die, means for cutting the press-worked portion of stock into lengths equal to the fed increments, means for advancing said lengths, and electrically controlled means including a switch for effectuating the operation of said feeding-advancing means and said cutting means sequentially.

2. In a machine, means for changing the angle of an angle bar comprising a unit attached to a fixed part of said machine, said unit having a pair of rollers for engaging the horizontal web of said angle bar and disposed in a housing therefor, said housing constituting a part of said unit and being pivotally connected at one end to one part of said unit and ball-and-socket connected to a vertically adjustable member also constituting a part of said unit, whereby vertical adjustment of said last-named member will cause the angular relation of the housing and the part to which it is pivotally connected to be changed, fixed guide means for the vertical web of said bar, said pair of rollers being mounted in gullies and free to move laterally with respect to each other to permit passing of the joggled portion of angle bar without deformation of the joggle.

3. A machine for turning out pierced and joggled angle pieces from a length of angle bar, which comprises in combination a machine bed, means on said bed for advancing a bar of stock, means on said bed for sequentially joggling and piercing a pre-determined portion of the stock, means on said bed for cutting the thus processed stock into pre-determined lengths, means for again actuating said advancing means to advance the processed portion a predetermined distance, and mechanism for operating all of said means in timed sequence.

4. A machine for turning out pierced and joggled angle pieces, from a length of angle bar, which comprises in combination a machine bed, means on said bed for automatically advancing angle bar stock in pre-determined increments, means for sequentially joggling and piercing a pre-determined length of said stock, means for cutting said length from the stock, means for actuating said advancing means to advance the cut length of said stock, means for curving the latter, and mechanism constructed and arranged to operate all of said means in succession.

5. A machine for turning out pierced and joggled angle pieces, from a length of angle bar, which comprises in combination a machine bed, means on said bed for automatically advancing angle bar stock in pre-determined increments, means for sequentially joggling and piercing a pre-determined length of said stock, means for cutting said length from the stock, means for again actuating said advancing means to advance the processed portion of said stock, an inclinable pair of jaws connected to said machine for changing the original angle of the cut length, and mechanism constructed and arranged to operate all of said means in succession.

6. A machine for turning out pierced and joggled angle pieces, from a straight length of angle bar stock, including in combination a press having joggle and piercing dies and arranged to sequentially joggle and pierce the bar in successive lengths, a saw on said machine adjacent said dies for cutting the thus processed stock into pre-determined lengths after it passes the dies, and a pair of inclinable rollers carried by said machine adjacent the saw to curve the said lengths, and feeder means for intermittently advancing the stock successively between the dies of the press, past the saw, and between the said rollers.

7. A machine for turning out pierced and joggled angle pieces, from a length of angle bar, including in combination a press having joggle and piercing dies and arranged to sequentially joggle and pierce the bar in successive lengths, and an inclinable pair of jaws associated with said machine for changing the original angle of the lengths of stock, and feeder means for intermittently advancing the angle bar stock between the dies and between said pair of jaws and means for operating the dies of the press, the angle changing means and the feeder means, all in timed sequence.

8. A machine for turning out pierced angle pieces with joggled ends, from a straight length of angle bar, including in combination a press having joggle and piercing dies and arranged to substantially simultaneously joggle and pierce the bar in successive lengths, feeder means for intermittently advancing the angle bar between the dies of the press, a saw for cutting the thus processed stock into pre-determined lengths after it passes the dies, a pair of inclinable rollers to curve the said lengths, and an inclinable pair of jaws connected to said machine for changing the original angle of the lengths of stock.

9. In a metal working machine for operating on angle bar stock, a base, a lower die-block secured to said base and comprising a base block, a second block longitudinally slidably adjustably interengaged with said base block and extending vertically thereabove, said second block having a shouldered extension running longitudinally thereof, an upper joggling die vertically slidably interengaged with said second block above the shouldered extension thereof, spring means between the shouldered extension and said die to maintain said joggling die normally yieldingly apart from said shouldered extension, said joggling die being of inverted L-shaped cross-section with its horizontal leg extending to overlie the part of the stock which is to be joggled, a lower joggling die adjustably positioned on said base block and below the horizontal leg of the upper joggling die and adjusted to cooperate with said upper joggling die to form a joggle on work between the dies, the upper horizontal surface of the lower joggling die along which the work may be fed having a shouldered depression in said surface into which the material from the work may be forced to form the joggle, spring means adapted to raise the joggled portion to the level of the die surface to permit the work to pass onto the next operation, means to adjust the position of the die block transversely of the base, said lower die-block having a recess through which the vertical web of the angle stock may slide, and means to depress the upper joggling die onto the stock to form a joggle.

10. In a metal working machine for operating on angle bar stock, the combination with a supporting bed of adjustably positioned joggling dies and adjustably positioned piercing dies, a pair of vertically reciprocating rams, one of said rams adapted to cooperate with the joggling dies and the other of said rams carrying adjustably positioned punches to cooperate with the piercing dies, said rams being constructed and arranged to operate substantially simultaneously to bring the joggling dies together to joggle and hold the work between the dies while the piercing dies are operated, means for advancing the bar stock between the cooperating dies in pre-determined increments, said latter means comprising stock-gripping jaws, a piston rod for carrying on one end thereof the said stock-gripping jaws, a piston on the other end of said piston rod, a cylinder within which said piston operates, fluid pressure means to move the piston in one direction, a spring to retract said piston, and valve means to control the admission of fluid to the cylinder.

11. In a metal working machine for operating on angle bar stock, the combination with a supporting bed of adjustably positioned joggling dies and adjustably positioned piercing dies, a pair of vertically reciprocating rams, one of said rams adapted to cooperate with the joggling dies and the other of said rams carrying adjustably positioned punches to cooperate with the piercing dies, said rams being constructed and arranged to operate substantially simultaneously to bring the joggling dies together to joggle and hold the work between the dies while the piercing dies are operated, means for advancing the bar stock between the cooperating dies in pre-determined increments, said latter means comprising stock-gripping jaws, a piston rod for carrying on one end thereof the said stock-gripping jaws, a piston on the other end of said piston rod, a cylinder within which said piston operates, fluid pressure means to move the piston in one direction, a spring to retract said piston, valve means to control the admission of fluid to the cylinder, means for cutting off the press-worked stock from the angle bar in lengths equal to said increments, a contouring mechanism through which the joggled stock must pass, and means for advancing the joggled length through said mechanism without distorting the joggled portions, and means for operating the rams of the press, the feeding means, the cut-off means, and the contouring mechanism in timed sequence.

12. In a metal working machine for operating on angle bar stock, the combination with a supporting bed of adjustably positioned joggling dies and adjustably positioned piercing dies, a pair of vertically reciprocating rams, one of said rams adapted to cooperate with the joggling dies and the other of said rams carrying adjustably positioned punches to cooperate with the piercing dies, said rams being constructed and arranged to operate substantially simultaneously to bring the joggling dies together to joggle and hold the work between the dies while the piercing dies are operated, means for advancing the bar stock between the cooperating dies in pre-determined increments, said latter means comprising stock-gripping jaws, a piston rod for carrying on one end thereof the said stock-gripping jaws, a piston on the other end of said piston rod, a cylinder within which said piston operates, fluid pressure means to move the piston in one direction, a spring to retract said piston, valve means to control the admission of fluid to the cylinder, means for cutting off the press-worked stock from the angle bar in lengths equal to the said increments, a contouring mechanism through which the joggled stock must pass, means for advancing the joggled length through said mechanism without distorting the joggled portions, angle changing mechanism through which the joggled stock must pass, means for advancing the joggled length of stock through said last named mechanism, means in said mechanism for permitting the joggled portions to pass without distortion thereof, and means for operating the rams of the press, the feeding means, the cut-off means, the contouring mechanism, and the angle changing mechanism in timed sequence.

13. A machine of the class described comprising in combination means for feeding angle bar stock in predetermined increments, a press for working upon said stock, adjustably positioned upper and lower cooperating joggling dies in said press, means for reciprocating the press to joggle the stock between said dies, means operative when the press is raised to elevate the stock to allow the joggled portion to pass by the lower die, means on said press adjacent the dies for cutting the press-worked portion of stock into lengths equal to the fed increments, means on said press for advancing said lengths and for effectuating the operation of said feeding-advancing means and said cutting means sequentially.

14. In a machine, means for curving straight lengths of angle bar stock selectively upwardly or downwardly in a single plane, said means comprising a fixed plate, a member inclinable on said fixed plate, said plate having two guide slots angularly disposed relative to each other, a pair of rollers between which the stock is fed, the roller opposite to the direction the stock is to be curved being arranged to engage the stock, each said roller having its end disposed in one of said slots, said slots being adapted to permit the rollers to assume laterally offset positions relative to a line joining the centers of said rollers when the inclinable member is in vertical position.

15. A machine for turning out pierced and joggled angle pieces from a length of angle bar stock which comprises in combination a machine bed, means on said bed for automatically advancing said stock in predetermined increments, means on said bed for sequentially joggling and piercing a predetermined length of said stock during a lull of the advancing means, means on said bed adjacent the joggling and piercing means, for cutting said length from the stock during said lull, means on said bed adjacent the cutting means, for curving the stock, means on said bed for again actuating said advancing means to advance the processed portion of said stock through said curving means, means on said bed adjacent said curving means for changing or correcting the original angle of the cut length of stock, means on said bed for again actuating the advancing means to feed the stock through the angle changing means and mechanism constructed and arranged to operate all of said means in succession.

16. In a metal working machine for operating on angle bar stock, the combination with a supporting bed of adjustably positioned joggling dies and adjustably positioned piercing dies carried by said bed, a pair of vertically reciprocating rams, one of said rams adapted to cooperate with the joggling dies and the other of said rams carrying adjustably positioned punches to cooperate with the piercing dies, said rams being constructed and arranged to operate substantially simultaneously to bring the joggling dies together to joggle and hold the work between the dies while the piercing dies are operated, and means on said bed for advancing the bar stock between the joggling and piercing dies in predetermined increments.

17. In a machine for turning out pierced and joggled pieces from a length of bar stock of structural shapes, the combination with a press, of a pair of rams telescopically operable one within the other, a machine bed, a die block adjustably positioned on said bed, piercing dies adjustably positioned on said die block, adjustably positioned piercing punches carried by the inner of said rams for cooperation with the piercing dies, a pressure yoke carried by the outer of said rams, said piercing punches operating through said yoke and independently thereof, joggling dies adjustably positioned in said die block and said joggling dies comprising upper and lower formers, the upper former being yieldingly supported above the lower former to provide a space between the two formers through which stock to be processed may pass, means to operate said rams to bring the pressure yoke down upon the upper former to joggle the stock and to hold the stock in clamped condition between the formers; to bring the piercing punches down to pierce the stock; to withdraw the piercing punches and then to elevate the pressure yoke to release the stock, and means to feed the stock between the upper and lower formers in predetermined increments.

18. In a machine for turning out pierced and joggled pieces from a length of bar stock of structural shapes, the combination with a press of a pair of rams telescopically operable one within the other, a machine bed, a die block adjustably positioned on said bed, piercing dies adjustably positioned on said die block, adjustably positioned piercing punches carried by the inner of said rams for cooperation with the piercing dies, a pressure yoke carried by the outer of said rams, said piercing punches operating through said yoke and independently thereof, joggling dies adjustably positioned in said die block and said joggling dies comprising upper and lower formers, the upper former being yieldingly supported above the lower former to provide a space between the two formers through which stock to be processed may pass, means to operate said rams to bring the pressure yoke down upon the upper former to joggle the stock and to hold the stock in clamped condition between the formers; to bring the piercing punches down to pierce the stock; to withdraw the piercing punches and then to elevate the pressure yoke to release the stock, and means to feed the stock between the upper and lower formers in predetermined increments, a saw on said machine for cutting the thus processed stock into predetermined lengths, and means controlled by the press-operating means for rendering the saw operative to cut the stock while the pressure yoke is holding the stock in clamped condition.

19. In a machine for turning out pierced and joggled pieces from a length of bar stock of structural shapes, the combination with a press of a pair of rams telescopically operable one within the other, a machine bed, a die block adjustably positioned on said bed, piercing dies adjustably positioned on said die block, adjustably positioned piercing punches carried by the inner of said rams for cooperation with the piercing dies, a pressure yoke carried by the outer of said rams, said piercing punches operating through said yoke and independently thereof, joggling dies adjustably positioned in said die block and said joggling dies comprising upper and lower formers, the upper former being yieldingly supported above the lower former to provide a space between the two formers through which stock to be processed may pass, means to operate said rams to bring the pressure yoke down upon the upper former to joggle the stock and to hold the stock in clamped condition between the formers; to bring the piercing punches down to pierce the stock; to withdraw the piercing punches and then to elevate the pressure yoke to release the stock, and means to feed the stock between the upper and lower formers in predetermined increments, and means on said machine controlled by the press-operating means for cutting the thus processed stock in predetermined lengths while the pressure yoke is holding the stock in clamped condition.

20. In a machine for turning out pierced and joggled pieces from a length of bar stock of structural shapes, the combination with a press of a pair of rams telescopically operable one within the other, a machine bed, a die block adjustably positioned on said bed, piercing dies adjustably positioned on said die block, adjustably positioned piercing punches carried by the inner of said rams for cooperation with the piercing dies, a pressure yoke carried by the outer of said rams, said piercing punches operating through said yoke and independently thereof, joggling dies adjustably positioned in said die block and said joggling dies comprising upper and lower formers, the upper former being yieldingly supported above the lower former to provide a space between the two formers through which stock to be processed may pass, means to operate said rams to bring the pressure yoke down upon the upper former to joggle the stock and to hold the stock in clamped condition between the formers; to bring the piercing punches down to pierce the stock; to withdraw the piercing punches and then to elevate the pressure yoke to release the stock, means operative when the pressure yoke is raised to elevate the stock to allow the joggled portion to pass by the lower former, and means to feed the stock between the upper and lower formers in predetermined increments.

21. A machine for turning out pierced and joggled angle pieces from a straight length of angle bar, including in combination a press having joggle and piercing dies arranged to substantially simultaneously joggle and pierce the bar in successive lengths, feeder means for intermittently advancing the angle bar between the dies of the press and therebeyond, and a saw on said machine adjacent said dies and operative during a lull of the feeding means, for cutting off the thus processed stock in predetermined lengths.

22. A machine for turning out joggled and pierced angle pieces from a straight length of angle bar, including in combination a press having joggle and piercing dies arranged to substantially simultaneously joggle and pierce the bar in successive lengths, feeder means for intermittently advancing the angle bar between the dies of the press and therebeyond, a saw on said machine adjacent said dies and operative during a lull of the feeder means for cutting the thus processed stock in predetermined lengths, and a pair of inclinable rollers carried by said machine adjacent the saw to curve the said lengths.

23. In a metal working machine for operating on angle bar stock, the combination with a supporting bed of adjustably positioned normally spaced apart upper and lower joggling dies and adjustably positioned piercing dies, a pair of vertically reciprocating rams, one of said rams adapted to cooperate with the joggling dies and the other of said rams carrying adjustably positioned punches to cooperate with the piercing dies, said rams being constructed and arranged to operate substantially simultaneously to bring the joggling dies together to joggle and hold the work between said dies while the punches are operated, and means for intermittently advancing the bar stock between the upper and lower dies in predetermined increments.

24. In a joggling and piercing press, means to feed bar stock intermittently in predetermined increments, means for severing a predetermined length from said bar during a lull of said feeding means, joggling and piercing dies arranged in said press to substantially simultaneously joggle and pierce the stock, means for stripping the stock from the piercing punches, a contouring device on said press and means to advance the severed processed length out from between the dies and through said contouring device.

25. In a joggling and piercing press, means to feed bar stock intermittently in predetermined increments, means for severing a predetermined length from said bar during a lull of said feeding means, joggling and piercing dies arranged in said press to substantially simultaneously joggle and pierce the stock, means for stripping the stock from the piercing punches after the stock has been pierced, means to advance the severed processed length out from between the dies, angle-changing mechanism through which the joggled stock must pass, means for advancing the joggled length of stock through said last named mechanism, said mechanism having means for permitting the joggled portions to pass without distortion thereof, and means for operating the rams of the press, the feeding means, the cut-off means, and the angle-changing mechanism all in timed sequence.

26. In a joggling and piercing press, means to feed bar stock intermittently in predetermined increments, means operative during a lull of said feeding means for severing a predetermined length from said stock, joggling and piercing dies arranged in said press to substantially simultaneously joggle and pierce the stock, means for stripping the stock from the piercing punches after the stock has been pierced, a contouring device, means to advance the stock out from between the dies and through said contouring device, angle-changing mechanism through which the joggled stock must pass, said means including an inclinable pair of jaws connected to said machine for changing the original angle of the lengths of stock, and means in the said mechanism for permitting the joggled portions to pass without distortion thereof, means for advancing the joggled length of stock through said angle-changing mechanism, and means for operating the rams of the press, the feeding means, the cut-off means, the contouring mechanism, and the angle-changing mechanism all in timed sequence.

27. In a joggling and piercing press for operating on work of structural shapes, joggling dies and piercing dies adjustably positioned in said press and constructed and arranged to substantially simultaneously joggle and pierce said work, feeding means for intermittently advancing said work into the press and out of the press, angle-changing mechanism through which the joggled work must pass, means for advancing the joggled work through said last-named mechanism, means in the said mechanism for permitting the joggled portions to pass without distortion thereof, and means for operating the rams of the press, the feeding means, and the angle-changing mechanism in timed sequence.

28. In a joggling and piercing press for operating on work of structural shapes, joggling dies and piercing dies adjustably positioned in said press and constructed and arranged to substantially simultaneously joggle and pierce said work, feeding means for intermittently advancing said work into the press and out of the press, a contouring mechanism and means to advance the processed length through said contouring mechanism, angle-changing mechanism through which the joggled stock must pass, said means including an inclinable pair of jaws connected to said machine for changing the original angle of the work, and means in the said mechanism for permitting the joggled portions to pass without distortion thereof, means for advancing the joggled work through said last-named mechanism, and means for operating the rams of the press, the feeding means, the contouring mechanism, and the angle-changing mechanism all in timed sequence.

29. In a machine, means for changing the angle of an angle bar comprising a unit floatingly attached to a fixed part of said machine, said unit having a pair of rollers for engaging the horizontal web of said angle bar, a housing in which the rollers are disposed, said housing constituting a part of said unit and being pivotally connected at one end to one part of said unit and ball-and-socket connected to a vertically adjustable member also constituting a part of said unit, whereby vertical adjustment of said last-named member will cause the angular relation of the housing and the part to which it is pivotally connected to be changed, fixed guide means for the vertical web of said angle bar, said pair of rollers being mounted in gullies in said housing and free to move laterally with respect to each other to permit passing of a joggled portion of angle bar without deformation of the joggle.

30. In a metal working machine for operating on stock of structural shapes, the combination with a supporting bed of adjustably positioned joggling dies and adjustably positioned piercing dies, said joggling dies comprising an upper and a lower die, the upper die being yieldingly supported above the lower die to provide a space between them through which the stock to be processed may be passed, a pair of vertically reciprocating rams, one of said rams adapted to cooperate with the joggling dies and the other of said rams carrying adjustably positioned piercing punches to cooperate with the piercing dies, said rams being constructed and arranged to operate substantially simultaneously to bring the joggling dies together to joggle and hold the work between them while the piercing dies are operated, and means for intermittently advancing the stock between the upper and lower dies.

31. In a metal working machine for operating on bar stock of structural shapes, the combination with a supporting bed of adjustably positioned joggling dies and adjustably positioned piercing dies, said joggling dies comprising an upper and a lower die, the upper die being yieldingly supported above the lower die to provide a space between them through which the stock to be processed may be passed, a pair of vertically reciprocating rams, one of said rams adapted to cooperate with the joggling dies and the other of said rams carrying adjustably positioned piercing punches to cooperate with the piercing dies, said rams being constructed and arranged to operate substantially simultaneously to bring the joggling dies together to joggle and hold the work between them while the piercing dies are operated, means for intermittently advancing the stock between the upper and lower dies in predetermined increments, means for cutting off the press-worked stock from the bar in lengths equal to said increments, a contouring mechanism through which the joggled stock must pass, means for advancing the joggled length through said mechanism without distorting the joggled portions thereof, and means for operating the press, the feeding means, the cut-off means and the contouring mechanism all in timed sequence.

32. In a metal working machine for operating on bar stock of structural shapes, the combination with a supporting bed of adjustably positioned joggling dies and adjustably positioned piercing dies, said joggling dies comprising an upper and a lower die, the upper die being yieldingly supported above the lower die to provide a space between them through which the stock to be processed may be passed, a pair of vertically reciprocating rams, one of said rams adapted to cooperate with the joggling dies and the other of said rams carrying adjustably positioned piercing punches to cooperate with the piercing dies, said rams being constructed and arranged to operate substantially simultaneously to bring the joggling dies together to joggle and hold the work between them while the piercing dies are operated, means for intermittently advancing the stock between the upper and lower dies in predetermined increments, means for cutting off the press-worked stock from the bar in lengths equal to said increments, a contouring mechanism through which the joggled stock must pass, means for advancing the joggled length through said mechanism without distorting the joggled portions thereof, angle-changing mechanism through which the joggled stock must pass, means for advancing the joggled length of stock through said last-named mechanism, means in said mechanism for permitting the joggled portions to pass without distortion thereof, and means for operating the press, the feeding means, the cut-off means and the contouring mechanism and the angle-changing mechanism all in timed sequence.

33. In a metal working machine for operating on bar stock of structural shapes, a base, a lower die-block secured to said base and comprising a base block, a second block longitudinally slidably adjustably interengaged with said base block and extending vertically thereabove, said second block having a shouldered extension running longitudinally thereof, an upper joggling die vertically slidably interengaged with said second block above the shouldered extension thereof, spring means between the shouldered extension and said die to maintain said joggling die normally yieldingly apart from said shouldered extension, said joggling die being of inverted L-shaped cross-section with its horizontal leg extending to overlie the part of the stock which is to be joggled, a lower joggling die adjustably positioned on said base block and below the horizontal leg of the upper joggling die and adjusted to cooperate with said upper joggling die to form a joggle on work between the dies, the upper horizontal surface of the lower joggling die along which the work may be fed having a shouldered depression in said surface into which the material from the work may be forced to form the joggle, means to adjust the position of the die block transversely of the base, said lower die-block having a recess through which the vertical web of the angle stock may slide, and means to depress the upper joggling die onto the stock to form a joggle.

34. In a metal working machine for operating on bar stock of structural shapes, a base, a lower die-block secured to said base and comprising a base block, a second block longitudinally slidably adjustably interengaged with said base block and extending vertically thereabove, said second block having a shouldered extension running longitudinally thereof, an upper joggling die vertically slidable interengaged with said second block above the shouldered extension thereof, means to facilitate separation of the upper and lower joggling dies, said upper joggling die being of inverted L-shaped cross-section with its horizontal leg extending to overlie the part of the stock which is to be joggled, a lower joggling die adjustably positioned on said base block and below the horizontal leg of the upper joggling die and adjusted to cooperate with said upper joggling die to form a joggle on work between the dies, the upper horizontal surface of the lower joggling die along which the work may be fed having a shouldered depression in said surface into which the material from the work may be forced to form the joggle, spring means adapted to raise the joggled portion to the level of the die surface to permit the work to pass on to the next operation, means to adjust the position of the die block transversely of the base, said lower die-block having a recess through which the vertical web of the angle stock may slide, and means to depress the upper joggling die onto the stock to form a joggle.

35. A machine for turning out pierced and joggled pieces from a length of bar stock of structural shapes, which comprises a machine bed, means on said bed for advancing the stock and means on said bed for sequentially joggling the stock, retaining the stock clamped against movement, piercing the stock, withdrawing the piercing punches from the pierced stock and releasing the clamping means to permit the stock to advance, and mechanism constructed and arranged for operating all said means in timed sequence.

ARTHUR G. MIREL.